US009346943B2

(12) United States Patent
Hoppe

(10) Patent No.: US 9,346,943 B2
(45) Date of Patent: May 24, 2016

(54) FIBER STRUCTURE, METHOD FOR ITS MANUFACTURE AND USE AS WELL AS FIBER-RESIN COMPOSITE MATERIAL

(71) Applicant: EMS-PATENT AG, Domat/Ems (CH)

(72) Inventor: Ralf Hoppe, Chur (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 13/772,766

(22) Filed: Feb. 21, 2013

(65) Prior Publication Data

US 2013/0225721 A1    Aug. 29, 2013

(30) Foreign Application Priority Data

Feb. 24, 2012  (EP) .................................... 12156901

(51) Int. Cl.
| | |
|---|---|
| C08K 7/02 | (2006.01) |
| D04H 1/587 | (2012.01) |
| D04H 3/12 | (2006.01) |
| D06M 15/507 | (2006.01) |
| D06M 17/04 | (2006.01) |
| D01F 6/86 | (2006.01) |
| D02G 3/40 | (2006.01) |
| C08J 5/24 | (2006.01) |
| D04H 1/4218 | (2012.01) |
| D04H 1/4242 | (2012.01) |
| D04H 1/4266 | (2012.01) |
| D04H 1/544 | (2012.01) |

(52) U.S. Cl.
CPC ... *C08K 7/02* (2013.01); *C08J 5/24* (2013.01); *D01F 6/86* (2013.01); *D02G 3/402* (2013.01); *D04H 1/4218* (2013.01); *D04H 1/4242* (2013.01); *D04H 1/4266* (2013.01); *D04H 1/544* (2013.01); *D04H 1/587* (2013.01); *D04H 3/12* (2013.01); *D06M 15/507* (2013.01); *D06M 17/04* (2013.01); *C08J 2363/00* (2013.01); *Y10T 428/2933* (2015.01); *Y10T 428/2967* (2015.01); *Y10T 428/2969* (2015.01); *Y10T 442/20* (2015.04)

(58) Field of Classification Search
CPC ................ C08K 7/02; C08J 5/24; D01F 6/86; D02G 3/402; D04H 1/4218
USPC ..................... 156/166, 93; 428/375, 394, 395; 442/59; 523/400; 524/13
See application file for complete search history.

(56) References Cited

U.S. PATENT DOCUMENTS

| | | | |
|---|---|---|---|
| 2,801,189 A | 7/1957 | Collier | |
| 5,561,213 A | 10/1996 | Poessnecker | |
| 5,736,596 A | 4/1998 | Heitz et al. | |
| 5,767,226 A | 6/1998 | Kinkelin et al. | |
| 6,020,063 A * | 2/2000 | Riffle et al. | 428/357 |
| 6,428,900 B1 * | 8/2002 | Wang | 428/481 |
| 8,778,479 B2 | 7/2014 | Bech | |
| 2002/0160674 A1 | 10/2002 | Kinkelin et al. | |
| 2003/0207639 A1 | 11/2003 | Lin | |
| 2006/0172636 A1 * | 8/2006 | Bech | 442/1 |
| 2009/0176903 A1 * | 7/2009 | Muenz et al. | 521/91 |

FOREIGN PATENT DOCUMENTS

| | | |
|---|---|---|
| CN | 1416456 A | 5/2003 |
| CN | 1758995 A | 4/2006 |
| CN | 101802088 A | 8/2010 |
| EP | 0698648 A2 | 2/1996 |
| EP | 0698649 A1 | 2/1996 |
| EP | 0824140 A1 | 2/1998 |
| EP | 1236567 A1 | 9/2002 |
| EP | 1359240 A1 | 11/2003 |
| EP | 1705269 A1 | 9/2006 |
| EP | 1892071 B1 | 11/2011 |
| ES | 2377536 T3 | 3/2012 |
| JP | 6-200468 A | 7/1994 |
| JP | 2005-60879 A | 3/2005 |

OTHER PUBLICATIONS

Machine translation of EP1705269, performed on Espacenet on Jun. 20, 2014.*
Mattheij, P., et al., "3D reinforced stiched carbon/epoxy laminate made by tailored fibre placement," Composites: Part A, 2000, 571-581.*
European Search Report dated Oct. 19, 2012 issued in corresponding EP 12156901.6 application (pp. 1-5).
Singapore Search Report dated Oct. 15, 2013 issued in corresponding SG 201300710-9 application (pp. 1-7).
English Translation Abstract of JP 06-200468 published Jul. 19, 1994.
English Translation Abstract of JP 2005-060879 published Mar. 10, 2005.
Chilean Office Action dated Jan. 7, 2015 for Chilean Patent Application No. 2013-000505.
English translation of relevant parts of Chilean Office Action dated Jan. 7, 2015 for Chilean Patent Application No. 2013-000505.

(Continued)

*Primary Examiner* — Liam J Heincer
*Assistant Examiner* — Nicholas Hill
(74) *Attorney, Agent, or Firm* — Millen, White, Zelano & Branigan, P.C.

(57) ABSTRACT

The invention relates to a fixed and/or stabilized fiber structure from a fibrous material as well as from an agent for its fixing and stabilizing. The agent for fixing and stabilizing is a statistical copolyester which is formed from the diacid components terephthalic acid and, optionally, isophthalic acid as well as the diol components butanediol, diethylene glycol and triethylene glycol. A method of manufacturing this fiber structure is also provided. The fiber structure is used as a reinforcement material for polymer matrices, in particular epoxy resins. A fiber composite material containing at least one thermosetting resin as well as the fiber structure in accordance with the invention is furthermore provided.

16 Claims, No Drawings

(56) References Cited

OTHER PUBLICATIONS

Mattheij et al., "3D Reinforced Stitched Carbon/Epoxy Laminates Made by Tailored Fibre Placement", 2000 Elsevier Science Ltd., Composites: Part A 31 (2000) pp. 571-581.
English language abstract for ES 2377536; published on Mar. 28, 2012.
Chinese Office Action dated Nov. 5, 2015 for corresponding Chinese Application No. 201310058776.4.
English language translation of Chinese Office Action dated Nov. 5, 2015 for corresponding Chinese Application No. 201310058776.4.
English language Abstract for Chinese Application No. CN 1416456; published May 7, 2003.
English language Abstract for Chinese Application No. CN 1758995; published Apr. 12, 2006.
English language Abstract for Chinese Application No. CN 101802088; published Aug. 11, 2010.

* cited by examiner

FIBER STRUCTURE, METHOD FOR ITS MANUFACTURE AND USE AS WELL AS FIBER-RESIN COMPOSITE MATERIAL

The invention relates to a fixed and/or stabilized fiber structure from a fibrous material as well as from an agent for its fixing and stabilizing. The agent for fixing and stabilizing is a statistical copolyester which is formed from the diacid components terephthalic acid and, optionally, isophthalic acid as well as the diol components butanediol, diethylene glycol and triethylene glycol. A method of manufacturing this fiber structure is also provided. The fiber structure is used as a reinforcement material for polymer matrices, in particular epoxy resins. A fiber composite material containing at least one thermosetting resin as well as the fiber structure in accordance with the invention is furthermore provided.

Materials having a high strength to mass ratio which are manufactured from a fiber composite material are used in many areas where strength, corrosion resistance and low weight are desired. Such fiber-resin composite materials can thus easily be used, for example, in components for aeronautics. These composites are equally exceptionally suitable for sports equipment articles such as tennis rackets or golf clubs.

The reinforcement elements are present in these composite materials either in the form of unidirectional filaments or in areal form, as fiber meshes, woven fabric or fiber nonwovens.

The fibers in the form of filaments or meshes, woven fabrics or nonwovens have to be fixed and stabilized, which serves a simplified handling and allows the bonding of individual surface structures or of a plurality of these surface structures by the effect of temperature or pressure. A stable preforming of the fixed or bonded single-layer or multilayer surface structures to preforms is likewise controllable by the influence of temperature and pressure.

The reinforcement materials manufactured and pretreated in this manner are then embedded in a polymer matrix. In this respect, the adhesion between the reinforcement material and the polymer matrix acquires a special significance.

Thermoplastic fiber materials are known from EP 1 705 269 A1 which are spun from a raw material containing polyhydroxy ether. These fibers from polyhydroxy ether are used as fixing threads for reinforcement fibers prior to their embedding in the polymer matrix.

Furthermore, copolyester hot melt adhesive substances are known from EP 0 698 649 A2 which show exceptional bonding properties, a low melting point, a fast crystallization and good resistance toward washing and cleaning.

Starting from this, it was the object of the present invention to provide fiber structures with improved stability.

This object is satisfied by the fiber structure having the features of claim 1 and by the method for its manufacture. The object is equally achieved by the fiber-resin composite material having the features of claim 11. Uses of the fiber structure in accordance with the invention are set forth in claim 15.

In accordance with the invention, a fixed and/or stabilized fiber structure from a fibrous material as well as from an agent for its fixing and stabilizing is provided.

The agent for fixing and stabilizing is a statistical copolyester in accordance with the invention which is formed from the following components:
from 55 to 100 mol % terephthalic acid;
from 0 to 45 mol % isophthalic acid;
from 35 to 75 mol % butanediol:
from 15 to 35 mol % diethylene glycol;
from 10 to 30 mol % triethylene glycol.

In this respect, the sum of the molar fractions of terephthalic acid and butanediol is a maximum of 150 mol % with respect to the total diacid and total diol quantities of 100 mol % each.

The at least one statistical copolyester is preferably formed from the following components:
from 70 to 100 mol %, preferably of 85 to 100 mol % terephthalic acid;
from 0 to 30 mol %, preferably of 0 to 15 mol % isophthalic acid;
from 45 to 65 mol %, preferably of 47 to 57 mol % butanediol;
from 20 to 30 mol %, preferably of 23 to 28 mol % diethylene glycol;
from 15 to 25 mol %, preferably of 20 to 25 mol % triethylene glycol.

In this respect, the sum of the molar fractions of terephthalic acid and butanediol is a maximum of 150 mol % with respect to the total diacid and total diol quantities of 100 mol % each.

In a preferred embodiment, the at least one statistical copolyester can contain 0 to 2% by weight, preferably 0.05 to 1% by weight additives, in particular nucleation agents, stabilizers, lubricants, antifoaming agents, condensation catalysts or mixtures thereof, with the sum of copolyester and additives producing 100% by weight.

The copolyester used in accordance with the invention preferably has a melting viscosity, measured according to ISO/DIN 1133, at 160° and a load of 2.16 kg, in the range of 100 to 3000 Pas, preferably of 100 to 600 Pas, particularly preferably of 120 to 500 Pas and very particularly preferred of 150 to 300 Pas.

If the copolyester in accordance with the invention is used in the form of a fixing thread, e.g. as a fiber yarn, multifilament or monofilament, it preferably has a melting viscosity, measured according to ISO/DIN 1133, at 160° and a load of 2.16 kg, in the range of 1000 to 3000 Pas, preferably of 1500 to 2500 Pas, particularly preferably of 1700 to 2200 Pas.

The copolyester used in accordance with the invention preferably has a melting point, measured according to ISO 11357 at a heating rate of 20 K/min, in the region of 60 to 160° C., preferably of 70 to 150° C., and particularly preferably of 90 to 140° C.

The manufacture of the polyester preferably takes place according to the following synthesis.

The aromatic dicarboxylic acid or dicarboxylic acid mixture is dispersed in the diol; the esterification catalyst and optionally suitable heat stabilizers are added, with the diol being used in excess of 5 to 50 mol %. The esterification takes place in a temperature range of 200 to 280° C., preferably 210 to 260° C., with heating taking place slowly. The arising water is distilled off in this process.

The subsequent polycondensation is carried out in an inertized autoclave in a temperature range of 220 to 270° C., preferably 230 to 260° C. and optionally in the presence of a polycondensation catalyst (1 to 100 ppm, preferably 10 to 45 ppm, with respect to the quantity of the polyester). In this respect, vacuum is applied stepwise and excess diol is extracted up to an end vacuum less than 1 mbar. After reaching the desired viscosity, the polyester which has arisen is removed, granulated and dried.

Salts of the metals Mn, Zn, Ca, Sn, Ti or Mg, e.g. with low aliphatic alcohols, e.g. butanol, can be used as esterification catalysts. Compounds on a basis of antimony, titanium, tin or germanium, e.g. antimony trioxide, are suitable as polycondensation catalysts. Both esterification catalysts and polycondensation catalysts are familiar to the skilled person in large numbers.

The fibrous material can preferably contain or substantially consist of a unidirectional filament or an areal fibrous material from the group of fabrics, fleeces, knitted meshes or knitted fabrics or nonwovens. Combinations of filaments and areal fibrous materials are equally possible.

The fibrous materials are preferably selected from the group comprising:
- glass fibers,
- carbon fibers,
- mineral fibers,
- synthetic fibers (in particular polymer fibers, preferably of polyesters and polyamides, in particular of polyaramides),
- natural fibers, in particular cotton, wool, kapok, hemp, linen, jute or wood as well as
- mixtures hereof.

In accordance with the invention, a method of manufacturing the previously described fiber structure is provided in which the at least one agent for fixing and stabilizing the fibrous material is applied to the fibrous material by powder point coating, paste point coating or scatter coating or as a paste, suspension, film, web, nonwoven, fixed nonwoven or woven fabric or sprayed melt and a fixing of the fiber structure subsequently takes place by the effect of temperature and/or pressure.

Alternatively, the fixing can also take place by sewing using fixing threads manufactured from the at least one statistical copolyester. In this process, the fixing is already reached without the subsequent effect of temperature and/or pressure.

Scatter coating or the application as a paste, suspension, film, web or sprayed melt or sewing are preferred as application methods. The application via scatter coating, web, sprayed melt or sewing is particularly preferred.

A further aspect of the present invention relates to a fiber-resin composite material which contains at least one thermosetting resin and at least one previously described fiber structure.

The thermosetting resin is preferably an epoxy resin.

It has surprisingly been found that the adhesion is improved with respect to the polymer matrix used for the embedding by the fixing with the copolyester in accordance with the invention.

The fiber-resin composite material preferably has a strength in the test of the interlaminar shear strength (ILSS) according to ASTM D2344M of at least 55 MPa, particularly preferably of at least 60 MPa, at a measuring temperature of 23° C.

It is furthermore preferred that the fiber-resin composite material in accordance with the invention has a compression after impact (CAI) in the test of the compression after impact according to AITM 1.0010 of at least 185 MPa, preferably of at least 210 MPa, particularly preferably of at least 240 MPa.

An additional aspect relates to the use of the previously explained fiber structure as a reinforcement material for epoxy resins, in particular in the areas of sports, leisure, machine industry, electronics, construction, medical engineering, means of traffic and transport and aerospace engineering.

The use of the previously explained fiber structure as a reinforcement material for epoxy resins is particularly preferred in the areas of sports, leisure, machine industry, means of traffic and transport and aerospace engineering.

The subject matter in accordance with the invention will be described in more detail below with reference to the following examples without intending to restrict it to the specific embodiments shown here.

The compositions of copolyesters in accordance with the invention (components (A1) to (A4)) and the composition of comparison systems (CoPES I, CoPES II, EVA, PA 6/12/66, PA 12, PE) are shown in Table 1.

TABLE 1

| Components | Description |
|---|---|
| CoPES (A1) | Copolyester of teraphthalic acid, isophthalic acid, butane diol, diethylene glycol and triethylene glycol (90/10/50/30/20 mol %) MV* 450 Pas, melting point 103° C. |
| CoPES (A2) | Copolyester of teraphthalic acid, isophthalic acid, butane diol, diethylene glycol and triethylene glycol (88/12/50/30/20 mol %) MV* 226 Pas, melting point 106° C. |
| CoPES (A3) | Copolyester of teraphthalic acid, isophthalic acid, butane diol, diethylene glycol and triethylene glycol (100/—/50/30/20 mol %) MV* 230 Pas, melting point 135° C. |
| CoPES (A4) | Copolyester of teraphthalic acid, isophthalic acid, butane diol, diethylene glycol and triethylene glycol (60/40/75/10/15 mol %) MV* 190 Pas, melting point 95° C. |
| CoPES1 | Copolyester of terephthalic acid, isophthalic acid, dimeric acid and butanediol (48/37/15/100 mol %) MV* 300 Pas, melting point 115° C. |
| CoPES II | Copolyester of terephthalic acid, isophthalic acid and butanediol (50/50/100 mol %) MV* 720 Pas, melting point 127° C. |
| EVA | Copolymer of ethylene and vinyl acetate MFR** 45 g/10 min, density 0.95 g/cm3, melting point 83° C. (Melthene MX09, Tosoh Corporation, Japan) |
| PA 6/12/66 | Copolyamide 6/12/66 (38/50/12 mol %) of ε-caprolactam, lauric lactam, hexamethylenediamine and adipic acid MV* 560 Pas, melting point 123° C. |
| PA 12 | Polyamide of lauric lactam MV 180 Pas at 230° C. and 2.16 kg, melting point 178° C. |
| PE-LD | Low-density polyethylene MFR** 7 g/10 min, density 0.922 g/cm3, vicat softening point 86° C. (HP7022, SABIC, Saudi Arabia) |

*Melting viscosity at 160° C. and 2.16 kg load
**Melt flow rate at 160° C. and 2.16 kg load
***Melt flow rate at 190° C. and 2.16 kg load Melthene MX06 can also be used alternatively to MX09.

The tests and measurements were carried out according to the following standards and on the following specimens.

Tension Peel Test

Measurement temperature 23° C.

Specimen Manufacture

A flat film of the thermoplastic to be tested (coating weight per unit area 200 g/m2) is laminated on a polyester-wool fabric (55/45% by weight, brown, coating weight per unit area 210 g/m2, manufacturer Becker Tuche, Germany, or Marzotto, Italy) by means of a double belt press. The laminating temperature in this respect is 30° C. above the melting point of the thermoplastics. A sample 24×8 cm is cut out after storing the laminate at 50° C. for 24 h. A plastic frame (15×5 cm) is placed onto the sample, with a waxed paper strip being placed under it at a narrow side. The frame is filled to a level of 3 mm with a freshly prepared, degassed epoxide mixture. The epoxide hardens at 23° C. for 12 to 16 h. The frame is then removed. The waxed paper strip allows the separation of the thermoplastic film and the epoxide over a length of around 3 cm.

The epoxide is mixed from a bisphenol A epoxy resin with an epoxide number of 0.520 to 0.550 eq./100 g (Grilonit C 1302, EMS-CHEMIE AG) and an amine hardener with an amine number of 290 to 350 mg KOH/g (Grilonit H 84048, EMS-CHEMIE AG) in a weight ratio of 2:1.

Determining the Interlaminar Shear Strength ILSS

ASTM D2344M

Measurement temperature: 23° C. and 80° C.

Specimen Manufacture

Plates having the dimensions 330×330×4 mm are first manufactured by resin transfer molding (RTM). For this purpose, a unidirectional carbon fiber filament having a coating weight per unit area of 298 g/m2 is manually placed into the mold cavity of a heatable press preheated to 80° C., has 18 g thermoplastic powder uniformly scattered over it using a sieve and this process is repeated 15 times, with the 2nd layer of the unidirectional carbon fiber filament being rotated by −45°, the 3rd layer by 45° and the 4th layer by 90° with respect to the 1st layer. The 5th layer of the 16-layer structure thus has the same orientation as the 1st layer. 18 g of thermoplastic powder are distributed over every layer with the exception of the 16th layer. After the closing of the mold, heating to 120° C. takes place under a vacuum (residual pressure 0.05 mbar) and when the temperature has been reached, the monocomponent epoxy resin (HexFlow RTM6 from Hexcel Corporation, USA) preheated to 80° C. is poured in. Hardening is at 180° C. and 6 bar pressure for 90 min. The pressure is subsequently lowered and cooling takes place simultaneously. The vacuum is maintained until the mold is opened. IMS 60 E13 from Toho Tenax Co., Japan, is used as the unidirectional carbon fiber filament. After the quality inspection of the plate using ultrasound, specimens are cut having the dimensions 24×8×4 mm. The specimens are brought to the measurement temperature 60 min. before the measurement. The pressure test takes place in a climate chamber.

The specimens for the comparison test are manufactured accordingly, but without any thermoplastic powder between the carbon fiber filaments.

Determining the Compression After Impact, CAI

AITM 1.0010 (Airbus standard)

Measurement temperature: 23° C.

Specimen Manufacture

The manufacture of the plates is as described for the ILSS test. After the quality inspection using ultrasound, specimens are cut having the dimensions 150×100×4 mm.

The specimens for the comparison test were manufactured accordingly, but without any thermoplastic powder between the carbon fiber filaments.

Before the strength test, an impact of 30 J is applied using a drop tower. The delamination area produced by this impact is determined using ultrasound. Subsequently, the remaining strength is measured at the same specimen and is given as the compression.

Melting Viscosity (MV) or Melt Flow Rate (MFR):

ISO 1133

Granulate

Melting Point

ISO standard 11357

Granulate

The differential scanning calorimetry (DSC) was carried out at a heating rate of 20 K/min. The temperature at the peak maximum is given.

Comparison trials with respect to the material properties were carried out using the named materials in accordance with the invention and comparison materials.

In this respect, the results of the tension peel test are shown in Table 2.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. EP 12 156 901.6, filed Feb. 24, 2012 are incorporated by reference herein.

TABLE 2

|  | Thermosetting plastic | Adhesion value [N/5 cm] |
|---|---|---|
| Example |  |  |
| 1 | CoPES (A1) | 132 |
| 2 | CoPES (A2) | 149 |
| 3 | CoPES (A3) | 150 |
| 4 | CoPES (A4) | 128 |
| Comparison example |  |  |
| 5 | CoPES1 | 25 |
| 6 | CoPES II | 11 |
| 7 | EVA | 34 |
| 8 | PA 6/12/66 | 7 |
| 9 | PA 12 | 1 |
| 10 | PE-LD | 1 |

The adhesion values obtained with the copolyesters (A1) to (A4) in accordance with the invention (Examples 1 to 4) are at least 3.7 times higher than those which were reached with copolyesters not in accordance with the invention, ethylene vinyl acetate, different polyamides or low-density PE as thermosetting plastic (comparison examples 5 to 10). Only the copolyesters in accordance with the invention will therefore be tested in the following.

The results of the test of the interlaminar shear strength (ILSS) are shown in Table 3.

TABLE 3

|  | Thermosetting plastic | Strength [MPa] 23° C. | Strength [MPa] 80° C. |
|---|---|---|---|
| Example | | | |
| 11 | CoPES (A1) | 65 | 49 |
| 12 | CoPES (A2) | 67 | 51 |
| 13 | CoPES (A3) | 68 | 57 |
| 14 | CoPES (A4) | 63 | 48 |
| Comparison example | | | |
| 15 | w/o | 50 | 45 |

The examples 11 to 14 show that the composite material has an increased strength due to the use of the copolyester in accordance with the invention both at 23° C. measurement temperature and at 80° C. measurement temperature in comparison with a composite material without a copolyester in accordance with the invention (comparison example 15).

The results of the test of the compression after impact (CAI) are shown in Table 4, i.e. the compression still measured at the specimen after the prior impact at 30 J and the delamination area arising due to the impact.

TABLE 4

|  | Thermosetting plastic | CAI [MPa] | Delamination area [mm2] |
|---|---|---|---|
| Example | | | |
| 16 | CoPES (A1) | 255 | 890 |
| 17 | CoPES (A2) | 259 | 850 |
| 18 | CoPES (A3) | 258 | 860 |
| 19 | CoPES (A4) | 253 | 900 |
| Comparison example | | | |
| 20 | w/o | 153 | 6050 |

Examples 16 to 19 show that the composite material has both a much increased strength and a substantially smaller delamination area due to the use of the copolyester in accordance with the invention in comparison with a composite material without a copolyester in accordance with the invention (comparison example 20).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A fiber-resin composite material containing at least one thermosetting resin as well as at least one fixed and/or stabilized fiber structure containing a fibrous material selected from the group consisting of glass fibers, carbon fibers, mineral fibers, synthetic fibers, and mixtures hereof; and
   an agent for its fixing and stabilizing,
      wherein the agent for fixing and stabilizing is at least one statistical copolyester comprising:
         from 55 to 100 mol % terephthalic acid;
         from 0 to 45 mol % isophthalic acid;
         from 35 to 75 mol % butanediol;
         from 15 to 35 mol % diethylene glycol;
         from 10 to 30 mol % triethylene glycol,
      wherein the sum of the molar fractions of terephthalic acid and butanediol is a maximum of 150 mol % with respect to the total diacid and total diol quantities of 100 mol % each,
   wherein the at least one statistical copolyester is present as a fixing thread and has a melting viscosity, measured according to ISO/DIN 1133, at 160° C. and a load of 2.16 kg, in the range of 100 to 3000 Pas, and
   wherein the fibrous material is in the form of a unidirectional filament or an areal fibrous material selected from the group consisting of fabrics, fleeces, knitted meshes, knitted fabrics, nonwovens, and combinations thereof.

2. The fiber-resin composite material of claim 1, wherein the at least one statistical copolyester comprises:
   from 70 to 100 mol % terephthalic acid,
   from 0 to 30 mol % isophthalic acid;
   from 45 to 65 mol % butanediol;
   from 20 to 30 mol % diethylene glycol; and
   from 15 to 25 mol % triethylene glycol,
   wherein the sum of the molar fractions of terephthalic acid and butanediol is a maximum of 150 mol % with respect to the total diacid and total diol quantities of 100 mol % each.

3. The fiber-resin composite material of claim 2, wherein the at least one statistical copolyester comprises:
   from 85 to 100 mol % terephthalic acid,
   from 0 to 15 mol % isophthalic acid;
   from 47 to 57 mol % butanediol;
   from 23 to 28 mol % diethylene glycol; and
   from 20 to 25 mol % triethylene glycol.

4. The fiber-resin composite material of claim 1, wherein the at least one statistical copolyester contains 0 to 2% by weight, of additives, wherein the sum of copolyester and additives equals 100% by weight.

5. The fiber-resin composite material of claim 4, wherein the at least one statistical copolyester contains 0.05 to 1% by weight of additives.

6. The fiber-resin composite material of claim 1, wherein the at least one statistical copolyester has a melting point, measured according to ISO 11357 at a heating rate of 20 K/min, in the range of 60 to 160° C.

7. The fiber-resin composite material of claim 6, wherein the melting point, measured according to ISO 11357 at a heating rate of 20 K/min, is in the range of 90 to 140° C.

8. The fiber-resin composite material of claim 6, wherein the at least one statistical copolyester has a melting point, measured according to ISO 11357 at a heating rate of 20 K/min, in the range of 70 to 150° C.

9. The fiber-resin composite material of claim 1, wherein the at least one thermosetting resin is an epoxy resin.

10. The fiber-resin composite material of claim 1, wherein the fiber-resin composite material has a compression after impact in the test of the compression after impact of at least 185 MPa.

11. The fiber-resin composite material of claim 10, wherein the fiber-resin composite material has a compression after impact in the test of the compression after impact of at least 245 MPa.

12. The fiber-resin composite material of claim 1, wherein the melting viscosity, measured according to ISO/DIN 1133, at 160° C. and a load of 2.16 kg is in the range of 100 to 600 Pas.

13. The fiber-resin composite material of claim 1, wherein the melting viscosity, measured according to ISO/DIN 1133, at 160° C. and a load of 2.16 kg is in the range of 150 to 300 Pas.

14. The fiber-resin composite material of claim 1, wherein the melting viscosity, measured according to ISO/DIN 1133, at 160° C. and a load of 2.16 kg is in the range of 1500 to 2500 Pas.

15. The fiber-resin composite material of claim 1, wherein the melting viscosity, measured according to ISO/DIN 1133, at 160° C. and a load of 2.16 kg is in the range of 1700 to 2200 Pas.

16. The fiber-resin composite material of claim 1, wherein the fiber-resin composite material has a strength in the interlaminar shear strength test of at least 55 MPa, at a measuring temperature of 23° C.

\* \* \* \* \*